United States Patent
Tani et al.

(10) Patent No.: US 11,433,413 B2
(45) Date of Patent: Sep. 6, 2022

(54) PAINT SYSTEM AND PAINT METHOD

(71) Applicant: TOYOTA JIDOSHA KABUSHIKI KAISHA, Toyota (JP)

(72) Inventors: Shinji Tani, Miyoshi (JP); Akira Numasato, Nagoya (JP); Kazuki Tanaka, Toyota (JP); Takufumi Kimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/225,612

(22) Filed: Apr. 8, 2021

(65) Prior Publication Data

US 2021/0370332 A1    Dec. 2, 2021

(30) Foreign Application Priority Data

Jun. 1, 2020   (JP) ............................ JP2020-095191

(51) Int. Cl.
*B05B 13/04*   (2006.01)
*B05B 16/00*   (2018.01)

(52) U.S. Cl.
CPC .......... *B05B 13/0431* (2013.01); *B05B 16/00* (2018.02)

(58) Field of Classification Search
None
See application file for complete search history.

(56) References Cited

U.S. PATENT DOCUMENTS

| | | | |
|---|---|---|---|
| 5,989,643 A  * | 11/1999 | Nakagawa .......... | B05B 13/0452 427/424 |
| 2010/0269750 A1* | 10/2010 | Vandepitte ............. | B25J 9/0093 118/314 |
| 2014/0220249 A1* | 8/2014 | Rouaud ............... | B05B 13/0431 427/256 |
| 2021/0101171 A1 | 4/2021 | Numasato et al. | |

FOREIGN PATENT DOCUMENTS

| | | |
|---|---|---|
| JP | 01-266870 A | 10/1989 |
| JP | 2011-525418 A | 9/2011 |
| WO | 2009/146936 A1 | 12/2009 |

* cited by examiner

*Primary Examiner* — Yewebdar T Tadesse
(74) *Attorney, Agent, or Firm* — Sughrue Mion, PLLC

(57) ABSTRACT

A paint system includes a paint unit having a first paint robot and a second paint robot. The first paint robot includes a first robot base and a first robot arm operably mounted on the first robot base. The second paint robot includes a second robot base and a second robot arm operably mounted on the second robot base. When a virtual plane extending in a vertical direction and along a direction of relative movement between an object to be painted and the paint unit is defined as a reference plane, a distance between the first robot base and the reference plane is set to be shorter than a distance between the second robot base and the reference plane. A passage range allowing passage of the second robot arm is provided under the first robot base.

9 Claims, 11 Drawing Sheets

PAINT SYSTEM AND PAINT METHOD

CROSS-REFERENCE TO RELATED APPLICATION

This application claims priority to Japanese Patent Application No. 2020-095191 filed on Jun. 1, 2020, incorporated herein by reference in its entirety.

BACKGROUND

1. Technical Field

The present disclosure relates to a paint system that paints an object to be painted such as a vehicle body of an automobile and a paint method in which the paint system is used, for example. In particular, the present disclosure relates to a paint system and a paint method in which at least two paint robots are provided on the same side with respect to a predetermined reference plane.

2. Description of Related Art

Japanese Unexamined Patent Application Publication No. 1-266870 (JP 1-266870 A) discloses a known paint system in which paint in a mist form is sprayed onto an object to be painted such as a vehicle body of an automobile to paint the object to be painted. In the paint system according to JP 1-266870 A, a plurality of paint robots is disposed along a transfer path for the object to be painted, and the respective arrangement height positions of the paint robots are offset in the up-down direction. In a specific example disclosed, a first paint robot that paints an upper surface of the object to be painted and a second paint robot that paints a side surface of the object to be painted are provided, the arrangement height position of the first paint robot is set to be higher than the arrangement height position of the second paint robot, and the arrangement position of the first paint robot is set to the outer side (farther side from the transfer path) with respect to the arrangement position of the second paint robot. That is, in the paint system according to JP 1-266870 A, each region of the object to be painted (the upper surface and the side surface of the object to be painted) is painted through combined use of a paint robot (first paint robot described above) that paints a region (e.g. the middle portion of the upper surface of the object to be painted) of the object to be painted that is closer to the middle portion of the transfer path and a paint robot (second paint robot described above) that paints a region (e.g. the side surface of the object to be painted) of the object to be painted that is farther from the middle portion of the transfer path.

SUMMARY

In general, a paint robot includes a robot base and a robot arm mounted on the robot base to extend toward an object to be painted on a transfer path. As disclosed in JP 1-266870 A, when the first paint robot which paints a region of the object to be painted that is closer to the middle portion of the transfer path and the second paint robot which paints a region of the object to be painted that is farther from the middle portion of the transfer path are used in combination with each other, it is necessary that the robot arm of the first paint robot should be elongated so that a spray gun provided at the distal end of the robot arm reaches the middle portion of the upper surface of the object to be painted. When the robot arm is elongated, however, the first paint robot may be increased in size, which may incur an increase in the size of the paint system. An increase in the size of the paint system leads to an increase in equipment cost and running cost, and therefore is not preferable.

As means for avoiding elongation of the robot arm, it is conceivable to set the position of the robot base of the first paint robot to a position that is close to the transfer path. In this case, however, simply setting the position of the robot base of the first paint robot to a position that is close to the transfer path could result in the movable range of the robot arm of the second paint robot being limited by the first paint robot (the movable range of the robot arm of the second paint robot being limited such that the second paint robot does not interfere with the first paint robot), which could adversely affect paint on the side surface of the object to be painted.

In this manner, it has been difficult, in a paint system in which a plurality of paint robots is disposed along a transfer path, to reduce the size of the paint robots and increase the movable range of robot arms at the same time.

The present disclosure provides a paint system that makes it possible to reduce the size of paint robots and increase the movable range of robot arms at the same time, and a paint method in which the paint system is used.

A first aspect of the present disclosure relates to a paint system. The paint system includes a paint unit that has a first paint robot configured to paint an upper region of an object to be painted and a second paint robot configured to paint a lower region of the object to be painted on a lower side with respect to the upper region. The first paint robot includes a first robot base and a first robot arm operably mounted on the first robot base. The second paint robot includes a second robot base and a second robot arm operably mounted on the second robot base. The object to be painted and the paint unit are movable relative to each other along a horizontal direction. When a virtual plane that extends in a vertical direction and along a direction of relative movement between the object to be painted and the paint unit is defined as a reference plane, the first paint robot and the second paint robot are disposed on the same side with respect to the reference plane. A distance between the first robot base and the reference plane is set to be shorter than a distance between the second robot base and the reference plane. An arrangement height position of the first robot base is set to be higher than an arrangement height position of the second robot base. A robot arm passage range that allows passage of the second robot arm is provided under the first robot base.

With the first aspect, when the paint system paints the object to be painted, the first paint robot paints the upper region of the object to be painted, and the second paint robot paints the lower region of the object to be painted on the lower side with respect to the upper region. In this event, the second paint robot, the second robot base of which is positioned below the arrangement height position of the first robot base (the distance of which from the reference plane is set to be shorter than the distance of the second robot base of the second paint robot from the reference plane) of the first paint robot, paints the lower region of the object to be painted (on the lower side with respect to the region painted by the first paint robot) with the second robot arm passing through the robot arm passage range which is provided under the first robot base. That is, the second robot arm paints the lower region on the lower side with respect to the region painted by the first paint robot without interfering with the first paint robot and with a sufficient movable range secured, even though the position of the first robot base is set to a position that is close to the transfer path (a position that is closer to the reference plane than the position of the second robot base). That is, a sufficient movable range of the second robot arm can be secured while reducing the length of the first robot arm by setting the position of the first robot base to a position that is close to the reference plane to reduce the distance between the object to be painted and the first robot base. Therefore, it is possible to reduce the size of the paint robots (in particular, the first paint robot) and increase the movable range of the robot arms (in particular, the second robot arm) at the same time. As a result, it is possible to reduce the size of the paint system along with a reduction in the size of the paint robots, and reduce the equipment cost and the running cost. It is also possible to reduce carbon dioxide ($CO_2$) because of a reduction in the size of the paint system. It is also possible to paint well the lower region of the object to be painted (on the lower side with respect to the region painted by the first paint robot) because of an increase in the movable range of the second robot arm.

The paint system according to the first aspect may further include a single control device configured to control both operation of the first paint robot and operation of the second paint robot.

With the configuration described above, it is possible to reduce the size of the control unit (unit for controlling the paint robots, including the control device) as a whole compared to the case where a plurality of control devices is provided to individually control respective operations of the paint robots, thereby contributing to a reduction in the size of the paint system.

The paint system according to the above aspect may further include a paint booth that constitutes a painting space that houses a transfer path for the object to be painted and the paint unit and that is blocked from outside. The control device may be arranged outside the paint booth.

With the configuration described above, it is possible to reduce the size of the internal space required for the paint booth compared to the case where the control device is arranged inside the paint booth. In a paint booth, in general, air conditioning is performed so as to generate a flow of air that causes a good flow of paint particles inside the paint booth (a flow of air for suppressing diffusion of paint particles that have not been applied). With the internal space of the paint booth reduced in size, however, it is possible to reduce the size of a space in which such an air flow is generated, and reduce the size of an air conditioning device for generating the air flow or reduce energy consumption.

In the above aspect, the first robot arm and the second robot arm may each include a spray gun configured to spray paint toward the object to be painted. At least one of the spray guns may be configured to electrostatically atomize the paint and spray the paint toward the object to be painted.

With the configuration described above, it is possible to improve the efficiency in applying the paint to the object to be painted, and reduce the range in which the paint sprayed toward the object to be painted is splashed back. Therefore, it is not necessary that the paint robots should be arranged at positions significantly away from the object to be painted so that the paint splashed back does not adhere to the paint robots, and the arrangement positions of the paint robots can be set to positions that are close to the object to be painted. As a result, it is possible to reduce the size of the paint system in the horizontal direction which is orthogonal to the direction of relative movement between the object to be painted and the paint unit, and reduce the equipment cost and the running cost. It is also possible to reduce $CO_2$ because of a reduction in the size of the paint system.

In the above aspect, A plurality of the paints unit may be arranged on a first side and a second side with respect to the reference plane. The paint unit which is arranged on the first side with respect to the reference plane may be configured such that the first paint robot paints a region, on the first side, of an upper surface of the object to be painted and the second paint robot paints a side surface, on the first side, of the object to be painted. The paint unit which is arranged on the second side with respect to the reference plane may be configured such that the first paint robot paints a region, on the second side, of the upper surface of the object to be painted and the second paint robot paints a side surface, on the second side, of the object to be painted.

With the configuration described above, it is possible to paint regions of the object to be painted on one side and the other side with respect to the reference plane well using the paint robots of the paint units, and finish the painted surfaces of the object to be painted well.

The paint system according to the above aspect may further include a rail configured to allow the first paint robot or the second paint robot to move along a transfer direction of the object to be painted.

In the paint system according to the first aspect, the first paint robot and the second paint robot may be configured to paint the object to be painted by spraying paint toward the object to be painted.

A second aspect of the present disclosure relates to a paint method in which the paint system according to the above aspect of the present disclosure is used. The method includes: the first paint robot painting the upper region of the object to be painted while the object to be painted and the paint unit are moved relative to each other along the horizontal direction; and the second paint robot painting the lower region of the object to be painted on the lower side with respect to the upper region.

With the second aspect, a sufficient movable range of the second robot arm can be secured by providing the robot arm passage range which allows passage of the second robot arm under the first robot base, while reducing the length of the first robot arm by setting the position of the first robot base to a position that is close to the reference plane to reduce the distance between the object to be painted and the first robot base. Therefore, it is possible to reduce the size of the paint robots and increase the movable range of the robot arms at the same time.

In the aspects of the present disclosure, the distance between the first robot base of the first paint robot, which paints the upper region of the object to be painted, and the reference plane (a virtual plane that extends in the vertical direction and along the direction of relative movement between the object to be painted and the paint unit) is set to be shorter than the distance between the second robot base of the second paint robot, which paints the lower region of the object to be painted on the lower side with respect to the upper region, and the reference plane, and the robot arm passage range which allows passage of the second robot arm of the second paint robot is provided under the first robot base. Consequently, it is possible to secure a sufficient movable range of the second robot arm while reducing the length of the first robot arm of the first paint robot. As a result, it is possible to reduce the size of the paint robots and increase the movable range of the robot arms at the same time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A plurality of embodiments of the present disclosure will be described below with reference to the drawings. In the following first to fourth embodiments, the present disclosure is implemented as a paint system that paints a vehicle body of an automobile and a paint method in which the paint system is used. In a fifth embodiment, meanwhile, a paint system paints an object to be painted other than a vehicle body.

First Embodiment

Figure 1:
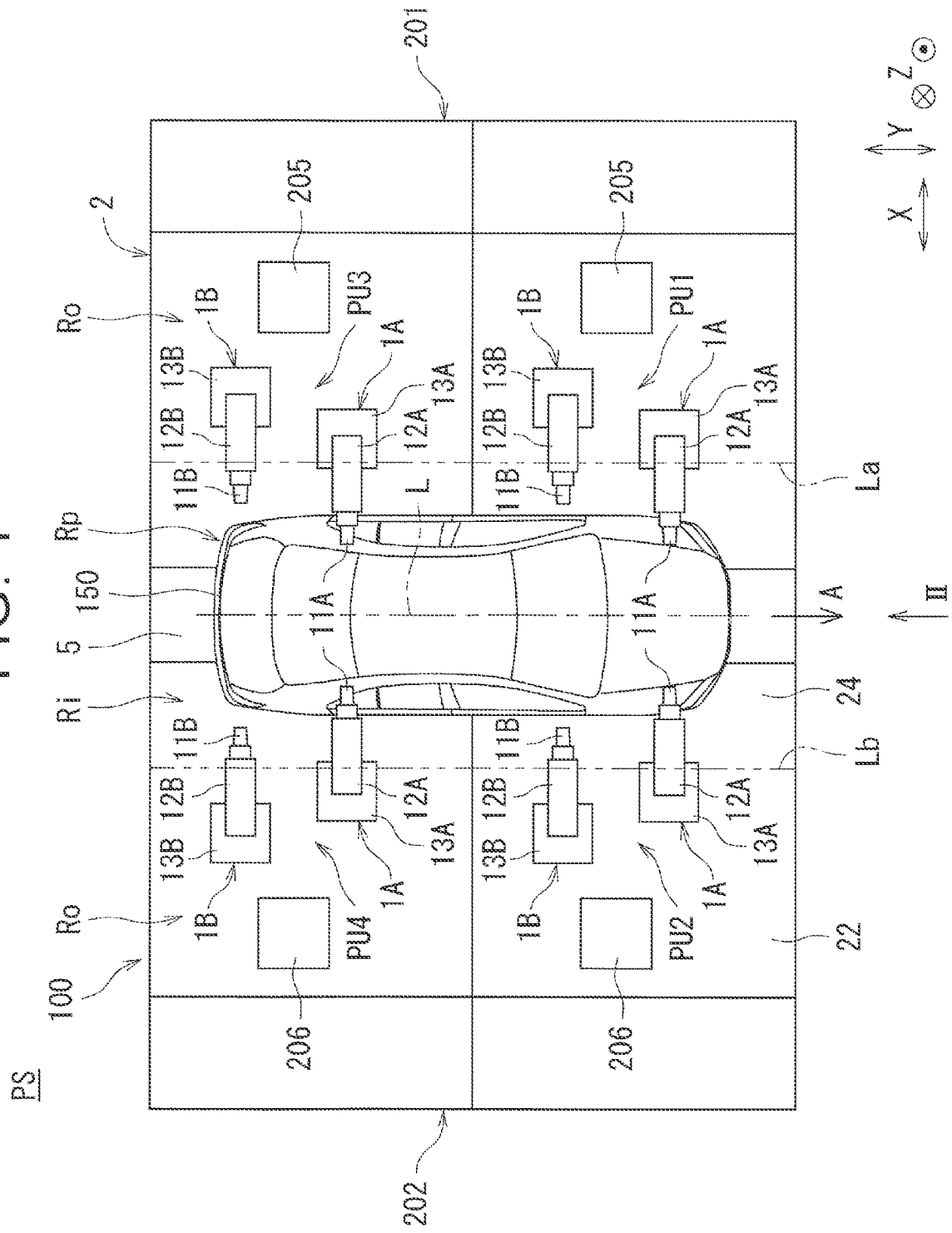
FIG. 1 is a plan view illustrating a paint system according to a first embodiment.
Figure 2:
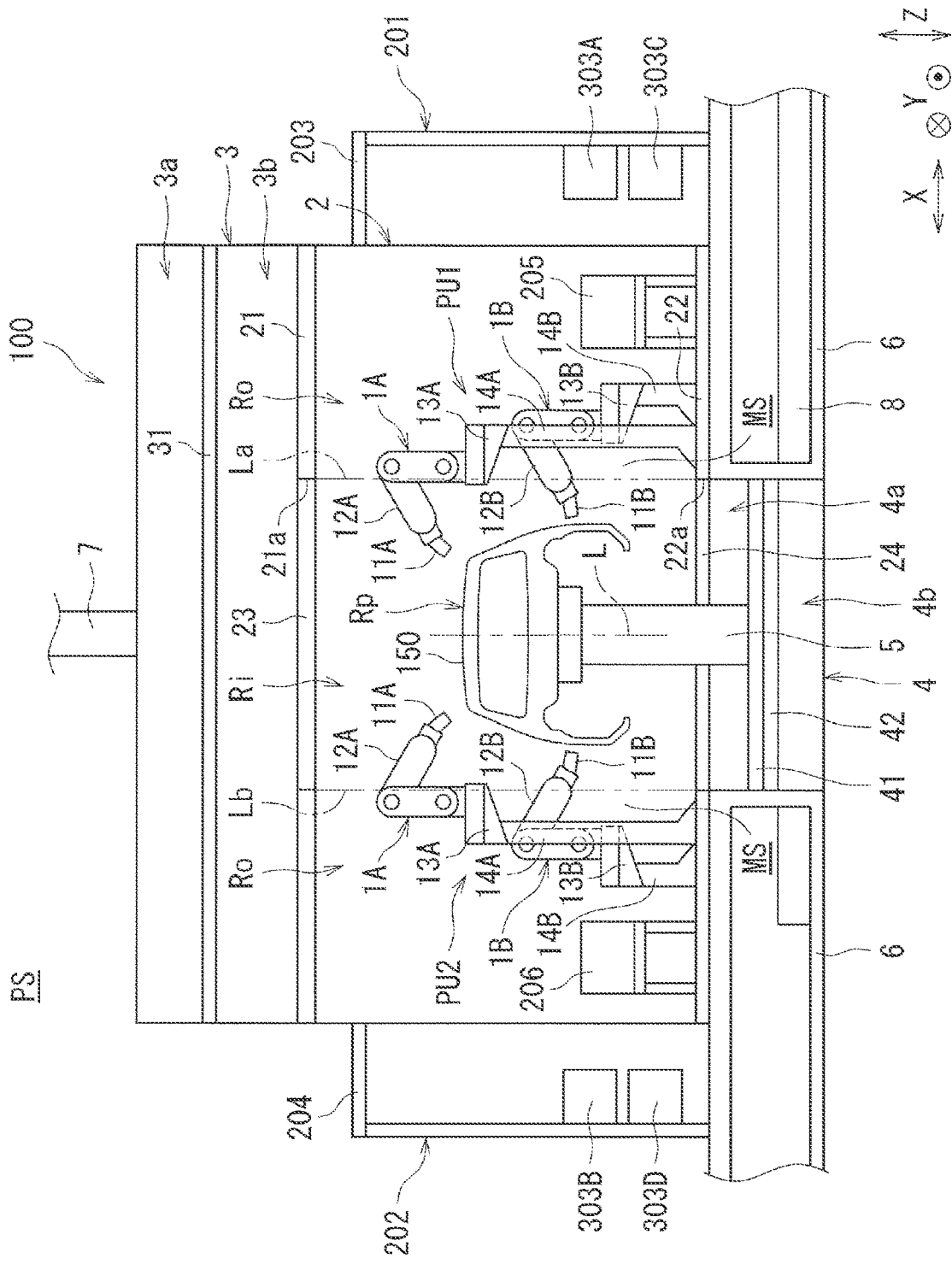
FIG. 2 is a front view illustrating the paint system according to the first embodiment.

A first embodiment is described first. FIG. 1 is a plan view illustrating a paint system PS according to the present embodiment. FIG. 2 is a front view (a view seen in the direction of the arrow II in FIG. 1) illustrating the paint system PS according to the present embodiment. As illustrated in the drawings, the paint system PS includes a paint booth 100, and a plurality of paint units PU1, PU2, PU3, and PU4 is installed inside the paint booth 100. Auxiliary booths 201 and 202 are installed on opposite outer sides (opposite outer sides in the horizontal direction) of the paint booth 100.

In FIGS. 1 and 2, the X direction corresponds to the width direction of the paint system PS, the Y direction corresponds to the length direction of the paint system PS (the transfer direction of a vehicle body 150 as an object to be painted), and the Z direction corresponds to the height direction of the paint system PS (up-down direction).

The paint booth 100 includes a transfer device 5 that transfers the vehicle body 150. Two of the paint units PU1, PU2, PU3, and PU4 are installed on each side of the transfer device 5 (each of both sides in a direction that is orthogonal to the transfer direction).

When the vehicle body 150 is transferred as indicated by the arrow A in FIG. 1 (when the vehicle body 150 is transferred by the transfer device 5 from the upper side toward the lower side in FIG. 1), the paint units PU1 and PU2 (more specifically, paint robots 1A and 1B that constitute the paint unit PU1, and paint robots 1A and 1B that constitute the paint unit PU2) which are positioned on the downstream side in the transfer direction mainly paint the front half of the vehicle body 150. That is, the paint unit PU1 (hereinafter referred to as "first paint unit PU1") which is positioned on the left side when facing the transfer direction (right side in FIG. 1) mainly paints the left half of an engine hood, a left front fender, a left front door, and the front half of the left side of a roof of the vehicle body 150. Meanwhile, the paint unit PU2 (hereinafter referred to as "second paint unit PU2") which is positioned on the right side when facing the transfer direction (left side in FIG. 1) mainly paints the right half of the engine hood, a right front fender, a right front door, and the front half of the right side of the roof of the vehicle body 150.

On the other hand, the paint units PU3 and PU4 (more specifically, paint robots 1A and 1B that constitute the paint unit PU3, and paint robots 1A and 1B that constitute the paint unit PU4) which are positioned on the upstream side in the transfer direction mainly paint the rear half of the vehicle body 150. That is, the paint unit PU3 (hereinafter referred to as "third paint unit PU3") which is positioned on the left side when facing the transfer direction (right side in FIG. 1) mainly paints a left rear fender, a left rear door, and the rear half of the left side of the roof of the vehicle body 150. Meanwhile, the paint unit PU4 (hereinafter referred to as "fourth paint unit PU4") which is positioned on the right side when facing the transfer direction (left side in FIG. 1) mainly paints a right rear fender, a right rear door, and the rear half of the right side of the roof of the vehicle body 150.

The paint units PU1 to PU4 have the same configuration as each other. FIG. 2 illustrates only the first paint unit PU1 and the second paint unit PU2.

The paint booth 100, the paint units PU1 to PU4, and the auxiliary booths 201 and 202 which constitute the paint system PS according to the present embodiment will be described below.

Paint Booth

The paint booth 100 is equipment for painting the vehicle body 150. The paint booth 100 includes a paint chamber (painting space) 2 in which the paint units PU1 to PU4 are installed, an air supply chamber 3 disposed above the paint chamber 2, a recovery chamber 4 disposed below the paint chamber 2, and the transfer device 5 which transfers the vehicle body 150.

The paint chamber 2 is supported by a support frame 6. A space for disposing the recovery chamber 4 is secured below the paint chamber 2. An introduction port 21a for introducing air is formed in a part of a ceiling portion 21 of the paint chamber 2. A discharge port 22a for discharging air is formed in a part of a floor portion 22 of the paint chamber 2. The introduction port 21a is provided with a filter 23. The discharge port 22a is provided with a grid plate 24. The filter 23 is provided in order to remove dust etc. in the air introduced into the paint chamber 2.

The air supply chamber 3 is provided in order to supply the paint chamber 2 with air for ventilation. An air supply duct 7 is connected to the air supply chamber 3. Air from an air conditioner (not illustrated) at an adjusted temperature and an adjusted humidity flows into the air supply chamber 3 via the air supply duct 7. The air supply chamber 3 has a function to rectify air that flows in from the air supply duct 7. An air amount adjustment mechanism 31 is provided in the internal space of the air supply chamber 3. Therefore, the internal space of the air supply chamber 3 is partitioned by the air amount adjustment mechanism 31 into an upstream space 3a and a downstream space 3b. The upstream space 3a communicates with the air supply duct 7. The downstream space 3b communicates with the paint chamber 2 via the filter 23 at the introduction port 21a. The air amount adjustment mechanism 31 is configured to adjust the amount of air in the air supply chamber 3 such that the amount of air around the vehicle body 150 is equal to a value set in advance.

The recovery chamber 4 is provided in order to recover paint particles in the air discharged from the paint chamber 2. An air discharge duct 8 is connected to the recovery chamber 4. The recovery chamber 4 communicates with the outside via the air discharge duct 8. A filter 41 and an air amount adjustment mechanism 42 are provided in the internal space of the recovery chamber 4. Therefore, the internal space of the recovery chamber 4 is partitioned by the filter 41 and the air amount adjustment mechanism 42 into an upstream space 4a and a downstream space 4b. The filter 41 is disposed on the upper side of the air amount adjustment mechanism 42 so that the filter 41 faces the upstream space 4a and the air amount adjustment mechanism 42 faces the downstream space 4b. The upstream space 4a communicates with the paint chamber 2 via the grid plate 24 at the discharge port 22a. The downstream space 4b communicates with the air discharge duct 8. The filter 41 is a thin dry-type filter, and is provided in order to remove paint particles in the air. The air amount adjustment mechanism 42 is configured to adjust the amount of air in the recovery chamber 4 such that the amount of air around the vehicle body 150 is equal to a value set in advance.

The transfer device 5 is provided in order to transfer the vehicle body 150 into the paint chamber 2 and transfer the vehicle body 150 out of the paint chamber 2. The transfer device 5 is configured to transfer the vehicle body 150 toward a front side of FIG. 2 when viewed on a paper, for example.

The paint booth 100 according to the present embodiment is configured such that air directed from the air supply chamber 3 toward the recovery chamber 4 flows through a predetermined region Ri in the paint chamber 2, and the air directed from the air supply chamber 3 toward the recovery chamber 4 does not flow through an area Ro outside the predetermined region in the paint chamber 2. The predetermined region Ri includes a passage region Rp through which the vehicle body 150 passes in the paint chamber 2, and an area around the passage region Rp (a range in which paint particles that have not been applied to the vehicle body 150 are suspended during painting). The area Ro outside the predetermined region is a region in the paint chamber 2 other than the predetermined region Ri, and is disposed on the outer side in the width direction (X direction) with respect to the predetermined region Ri.

Specifically, the introduction port 21a of the paint chamber 2 is disposed so as to correspond to the passage region Rp for the vehicle body 150. The width (length in the X direction) of the introduction port 21a is larger than the width of the vehicle body 150, and smaller than the width of the paint chamber 2. For example, the width of the introduction port 21a is set based on the width of the vehicle body 150, the range in which paint particles (overspray mist) that have not been applied to the vehicle body 150 are suspended during painting, etc. That is, the width of the introduction port 21a is set such that the range of generation of overspray mist is included in the predetermined region Ri through which air flows while forming the area Ro outside the predetermined region through which air does not flow. The introduction port 21a is provided over the entire length of the paint chamber 2 in the length direction (Y direction).

The discharge port 22a of the paint chamber 2 is disposed so as to correspond to the passage region Rp for the vehicle body 150. The width (length in the X direction) of the discharge port 22a is set to be the same as the width of the introduction port 21a, for example. The width of the discharge port 22a is set such that the range of generation of overspray mist is included in the predetermined region Ri through which air flows while forming the area Ro outside the predetermined region through which air does not flow. The discharge port 22a is provided over the entire length of the paint chamber 2 in the length direction.

At this time, air directed from the introduction port 21a toward the discharge port 22a mainly passes through a space between a long dashed double-short dashed line La that connects between a first end portion of the introduction port 21a in the width direction and a first end portion of the discharge port 22a in the width direction and a long dashed double-short dashed line Lb that connects between a second end portion of the introduction port 21a in the width direction and a second end portion of the discharge port 22a in the width direction. Therefore, the predetermined region Ri is a region that includes the space between the long dashed double-short dashed lines La and Lb and that additionally includes an area in which the air flow is spread, for example.

Paint Units

The paint units PU1 to PU4 each include two paint robots 1A and 1B. That is, the paint system PS is configured to include eight paint robots 1A, 1B, . . . . The paint robots 1A, 1B, . . . are air-driven multi joint robots of the same configuration, and are configured to atomize paint and apply the atomized paint to the vehicle body 150. The paint robots 1A, 1B, . . . each include a spray gun 11A, 11B that atomizes paint, a robot arm 12A, 12B that moves the spray gun 11A, 11B, a robot base 13A, 13B that supports the robot arm 12A, 12B, and a support column 14A, 14B to which the robot base 13A, 13B is attached. The support column 14A, 14B is formed so as to extend upward from the floor portion 22 of the paint chamber 2.

The two paint robots 1A and 1B provided in each of the paint units PU1 to PU4 are installed in different states, and accordingly have different roles. The paint robots 1A and 1B provided in each of the paint units PU1 to PU4 include a first paint robot 1A that mainly paints the upper region of the vehicle body 150 and a second paint robot 1B that mainly paints a region from the side region to the lower region of the vehicle body 150. For example, in the first paint unit PU1 and the second paint unit PU2, the first paint robot 1A mainly paints the roof and the engine hood of the vehicle body 150, while the second paint robot 1B mainly paints the front fender and the front door of the vehicle body 150.

Hereinafter, the robot arm 12A of the first paint robot 1A will be referred to as a first robot arm 12A, and the robot arm 12B of the second paint robot 1B will be referred to as a second robot arm 12B. The robot base 13A of the first paint robot 1A will be referred to as a first robot base 13A, and the robot base 13B of the second paint robot 1B will be referred to as a second robot base 13B.

In the present embodiment, the first paint robot 1A and the second paint robot 1B in each of the paint units PU1 to PU4 are arranged such that the first paint robot 1A is arranged downstream (on the lower side in FIG. 1) of the second paint robot 1B in the transfer direction of the vehicle body 150 as illustrated in FIG. 1.

As one feature of the present embodiment, the installation position of the support column 14A of the first paint robot 1A in each of the paint units PU1 to PU4 is set to a position that is closer to the transfer device 5 than the installation position of the support column 14B of the second paint robot 1B. In other words, when a virtual plane (a virtual plane that passes through the center of the vehicle body 150) that extends in the vertical direction and along the direction of transfer of the vehicle body 150 by the transfer device 5 is defined as a reference plane L, the distance (distance in the horizontal direction) between the installation position of the support column 14A of the first paint robot 1A in each of the paint units PU1 to PU4 and the reference plane L is set to be shorter than the distance between the installation position of the support column 14B of the second paint robot 1B and the reference plane L. When the respective installation positions of the support columns 14A and 14B are described specifically, the installation position of the support column 14A of the first paint robot 1A is determined slightly on the outer side in the width direction with respect to the discharge port 22a. That is, the support column 14A is disposed at a position not overlapping the introduction port 21a and the discharge port 22a (a position displaced from the introduction port 21a and the discharge port 22a) as seen in plan. On the contrary, the installation position of the support column 14B of the second paint robot 1B is determined on the outer side in the width direction with respect to the discharge port 22a by a predetermined dimension. That is, the support column 14B of the second paint robot 1B is disposed on the outer side with respect to the support column 14A of the first paint robot 1A. That is, the respective support columns 14A and 14B of the paint robots 1A and 1B (the paint robots 1A and 1B which are disposed on the same side with respect to the reference plane L) are disposed at positions not overlapping the introduction port 21a and the discharge port 22a (positions displaced from the introduction port 21a and the discharge port 22a) as seen in plan, and disposed in the area Ro outside the predetermined region, and the installation position of the support column 14B of the second paint robot 1B is set on the outer side with respect to the installation position of the support column 14A of the first paint robot 1A.

As discussed earlier, the robot bases (first robot base and second robot base) 13A and 13B are attached to the respective upper ends of the support columns 14A and 14B in the paint robots 1A and 1B. Therefore, by setting the respective installation positions of the support columns 14A and 14B as discussed earlier, the distance between the first robot base 13A in each of the paint units PU1 to PU4 and the reference plane L is set to be shorter than the distance between the second robot base 13B in each of the paint units PU1 to PU4 and the reference plane L.

As another feature of the present embodiment, the height dimension of the support column 14A of the first paint robot 1A in each of the paint units PU1 to PU4 is set to be larger than the height dimension of the support column 14B of the second paint robot 1B. Therefore, the arrangement height position of the first robot base 13A is set to be higher than the arrangement height position of the second robot base 13B. As a result, the installation position of the first robot arm 12A is also higher than the installation position of the second robot arm 12B, and the first paint robot 1A plays a role in painting the upper region of the vehicle body 150, and the second paint robot 1B plays a role in painting the lower region on the lower side with respect to the region painted by the first paint robot 1A. In particular, the first paint robot 1A paints the roof of the vehicle body 150, and thus paints the middle portion (middle portion in the vehicle width direction) of the roof. As a result, a region (in particular, the roof) of the vehicle body 150 to be painted by the first paint robot 1A includes a region that is closer to the reference plane L than a region of the vehicle body 150 to be painted by the second paint robot 1B.

Since the paint robots 1A and 1B are installed in this manner, the respective first paint robots 1A and 1A of the first paint unit PU1 and the second paint unit PU2 are disposed so as to face each other with the passage region Rp for the vehicle body 150 interposed therebetween in the width direction, as illustrated in FIG. 2. Similarly, the respective second paint robots 1B and 1B of the first paint unit PU1 and the second paint unit PU2 are also disposed so as to face each other with the passage region Rp for the vehicle body 150 interposed therebetween in the width direction. In addition, the respective first paint robots 1A and 1A of the third paint unit PU3 and the fourth paint unit PU4 are disposed so as to face each other with the passage region Rp for the vehicle body 150 interposed therebetween in the width direction. Similarly, the respective second paint robots 1B and 1B of the third paint unit PU3 and the fourth paint unit PU4 are also disposed so as to face each other with the passage region Rp for the vehicle body 150 interposed therebetween in the width direction.

The width (dimension in the X direction) of the robot bases 13A and 13B of the paint robots 1A and 1B is set to be larger than the width of the support columns 14A and 14B. The robot bases 13A and 13B are attached to the upper portions of the support columns 14A and 14B with the outer ends of the robot bases 13A and 13B in the width direction aligned with the outer ends of the support columns 14A and 14B in the width direction. That is, the robot bases 13A and 13B extend toward the central side in the width direction from the upper portion of the support columns 14A and 14B. Therefore, the support columns 14A and 14B do not exist in a region under the extending portion of the robot bases 13A and 13B. For the first paint robot 1A, a range (space) under the extending portion is secured as a passage range (robot arm passage range according to the present disclosure) MS for the second robot arm 12B during paint work. Specifically, the arrangement height position of the first robot base 13A is higher than the upper end of the fenders of the vehicle body 150, whereby the passage range MS is extended to the upper side of the fenders.

The spray guns 11A and 11B provided in the paint robots 1A and 1B will be described. The spray guns 11A and 11B of the paint robots 1A and 1B are of the same configuration, and thus the spray gun 11A provided in the first paint robot 1A will be described in representation.

Figure 3:
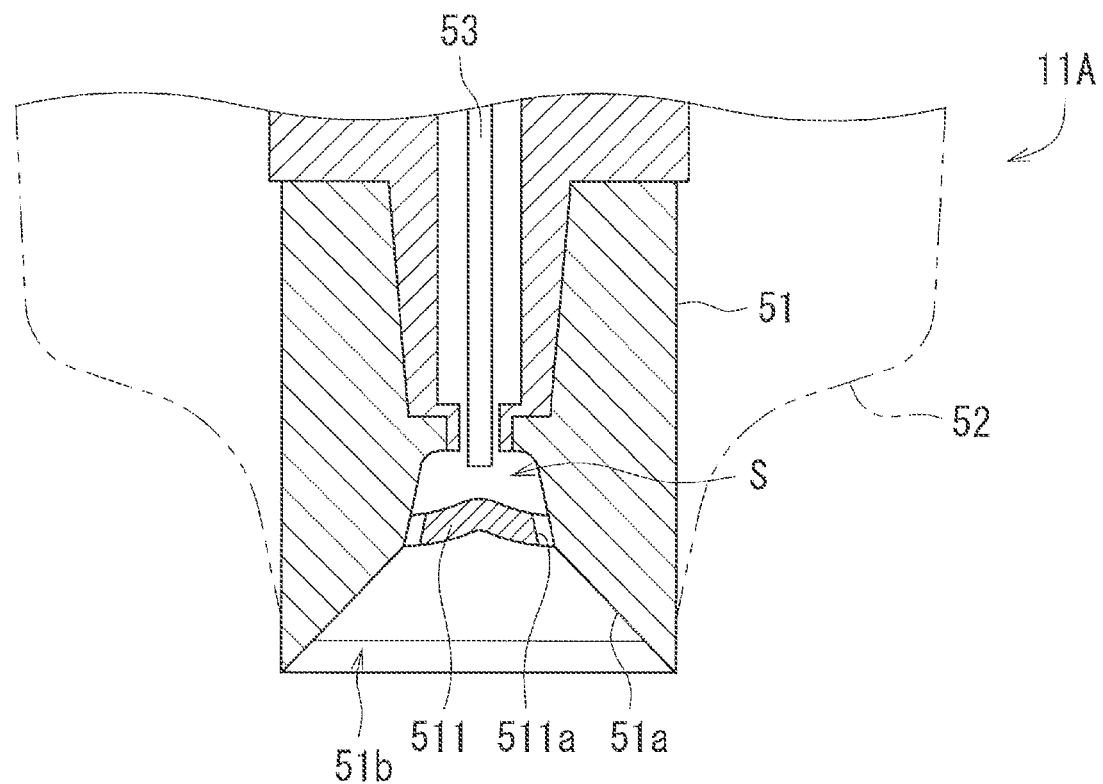
FIG. 3 is a sectional view illustrating a spray gun provided in a paint robot.
Figure 4:
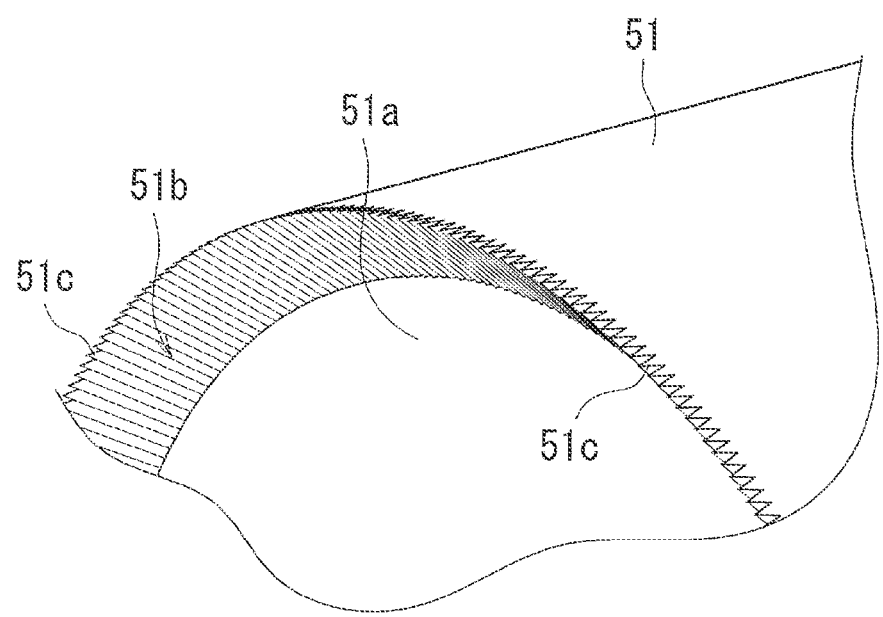
FIG. 4 is a perspective view illustrating the distal end of a rotary head of the spray gun.
Figure 5:
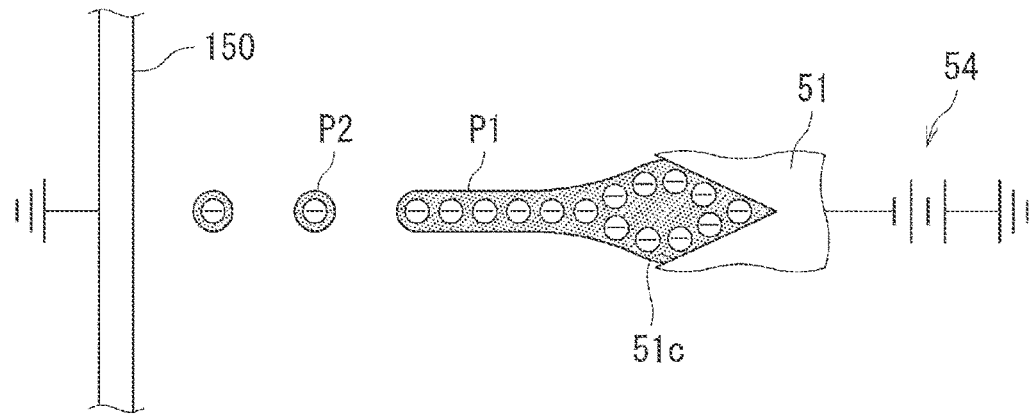
FIG. 5 is a schematic diagram illustrating electrostatic atomization of paint.

FIG. 3 is a sectional view illustrating the spray gun 11A. FIG. 4 is a perspective view illustrating the distal end of a rotary head 51 of the spray gun 11A. FIG. 5 is a schematic diagram illustrating electrostatic atomization of paint.

The spray gun 11A is configured to release streaks of paint P1 from the rotary head 51, form paint particles (atomized paint) P2 when the streaks of paint P1 are electrostatically atomized, and apply the paint particles P2 to the vehicle body 150.

As illustrated in FIG. 3, the spray gun 11A includes the rotary head 51, an air motor (not illustrated) that rotates the rotary head 51, a cap 52 that covers the outer peripheral surface of the rotary head 51, a paint supply pipe 53 that supplies paint to the rotary head 51, and a voltage generator 54 (see FIG. 5) that applies a negative high voltage to the rotary head 51.

The rotary head 51 is configured to be supplied with liquid paint and release the paint using a centrifugal force. A hub 511 is attached to the rotary head 51 to form a paint space S. The paint is supplied from the paint supply pipe 53 to the paint space S. A plurality of outflow holes 511a is formed in the outer edge portion of the hub 511 to allow the paint to flow out of the paint space S.

A diffusion surface 51a over which the paint is diffused by a centrifugal force is formed on the rotary head 51 on the outer side in the radial direction with respect to the outflow holes 511a. The diffusion surface 51a is formed so as to become larger in diameter toward the distal end of the rotary head 51, and configured to form the paint that has flowed out from the outflow holes 511a into a film form. As illustrated in FIG. 4, groove portions 51c are formed at an outer edge portion 51b of the diffusion surface 51a to form the paint in the film form into streaks and release the streaks of paint. In FIG. 3, the groove portions 51c are not illustrated in consideration of viewability.

The groove portions 51c are formed so as to extend in the radial direction when seen in the axial direction. A plurality of groove portions 51c is provided in the circumferential direction. That is, the groove portions 51c are formed in the outer edge portion 51b of the diffusion surface 51a so as to extend in the direction of inclination of the diffusion surface 51a. The groove portions 51c are formed so as to reach the outer end portion, in the radial direction, of the rotary head 51. Therefore, the distal end of the rotary head 51 is in a recessed and projected shape as seen from the side of the outer peripheral surface.

In the spray gun 11A, as illustrated in FIG. 5, the voltage generator 54 applies a negative high voltage to the rotary head 51 to charge the streaks of paint P1 released from the groove portions 51c of the rotary head 51. The streaks of paint P1 are atomized into the paint particles P2 using a repulsive force due to the electrical charge. That is, the streaks of paint P1 released from the groove portions 51c of the rotary head 51 are electrostatically atomized into the paint particles P2. That is, the paint robots 1A and 1B are not provided with an air discharging portion that discharges shaping air, and therefore the paint particles P2 are formed without using shaping air. Thus, the paint robots 1A and 1B are of an electrostatic atomization type that does not use shaping air, and do not generate a rise of paint particles due to shaping air. Thus, generation of overspray mist is suppressed, and the range of generation of overspray mist is narrowed.

The paint booth 100 also includes cartridge stockers 205 (206) that each house a paint cartridge (not illustrated) to be loaded into the spray guns 11A and 11B of the paint robots 1A and 1B. The cartridge stockers 205 (206) house a plurality of types of paint cartridges that matches the types of paint to be used for painting in the paint system PS. When the amount of paint remaining in the paint cartridge loaded into the spray guns 11A and 11B has become small, or when the type of paint to be used for paining of the vehicle body 150 to be transferred into the paint system PS next is changed (e.g. for a color change) after the paint work in the paint system PS is ended, a desired paint cartridge is transferred from the cartridge stocker 205 (206) toward the spray guns 11A and 11B in order to replace the paint cartridge loaded into the spray guns 11A and 11B. The paint cartridge is transferred by a transfer robot (not illustrated), for example.

Although not described in detail, paint supply piping is connected to the cartridge stocker 205 (206) to individually inject (supply) predetermined paint to each paint cartridge housed, so that paint to be used for the next painting is injected into the paint cartridge housed in the cartridge stocker 205 (206).

Auxiliary Booths

The auxiliary booths 201 and 202 are arranged on opposite outer sides (opposite outer sides in the horizontal direction) of the paint booth 100. The auxiliary booth 201 positioned on the right side in FIG. 2 will be referred to as a "first auxiliary booth". The auxiliary booth 202 positioned on the left side in FIG. 2 will be referred to as a "second auxiliary booth".

The auxiliary booths 201 and 202 are constituted as a space surrounded by frames 203 and 204. The auxiliary booths 201 and 202 include control devices 303A, 303B, 303C, and 303D that control the devices provided in the paint units PU1 to PU4. That is, a first control device 303A that controls the devices provided in the first paint unit PU1 and a third control device 303C that controls the devices provided in the third paint unit PU3 are arranged in the first auxiliary booth 201. Meanwhile, a second control device 303B that controls the devices provided in the second paint unit PU2 and a fourth control device 303D that controls the devices provided in the fourth paint unit PU4 are arranged in the second auxiliary booth 202. In the present embodiment, the control devices 303A to 303D are supported on a side surface of the frames 203 and 204 (a side surface of the auxiliary booths 201 and 202 that faces inward).

In this manner, the control devices 303A to 303D are provided in correspondence with the paint units PU1 to PU4, respectively. The paint units PU1 to PU4 each include two paint robots 1A and 1B. Therefore, the control devices 303A to 303D each have a function to control both the two paint robots 1A and 1B. In other words, the control devices 303A to 303D are each a single (for each of the paint units PU1 to PU4) control device 303A (303B, 303C, 303D) that controls both operation of the first paint robot 1A and operation of the second paint robot 1B. As discussed earlier, the paint robots 1A, 1B, ... are air-driven multi joint robots. Therefore, the control devices 303A, 303B, 303C, and 303D are each configured to include a pneumatic panel that controls the paint robot 1A (1B). The control devices 303A, 303B, 303C, and 303D may each include a circuit board.

Configuration of Control System

Figure 6:
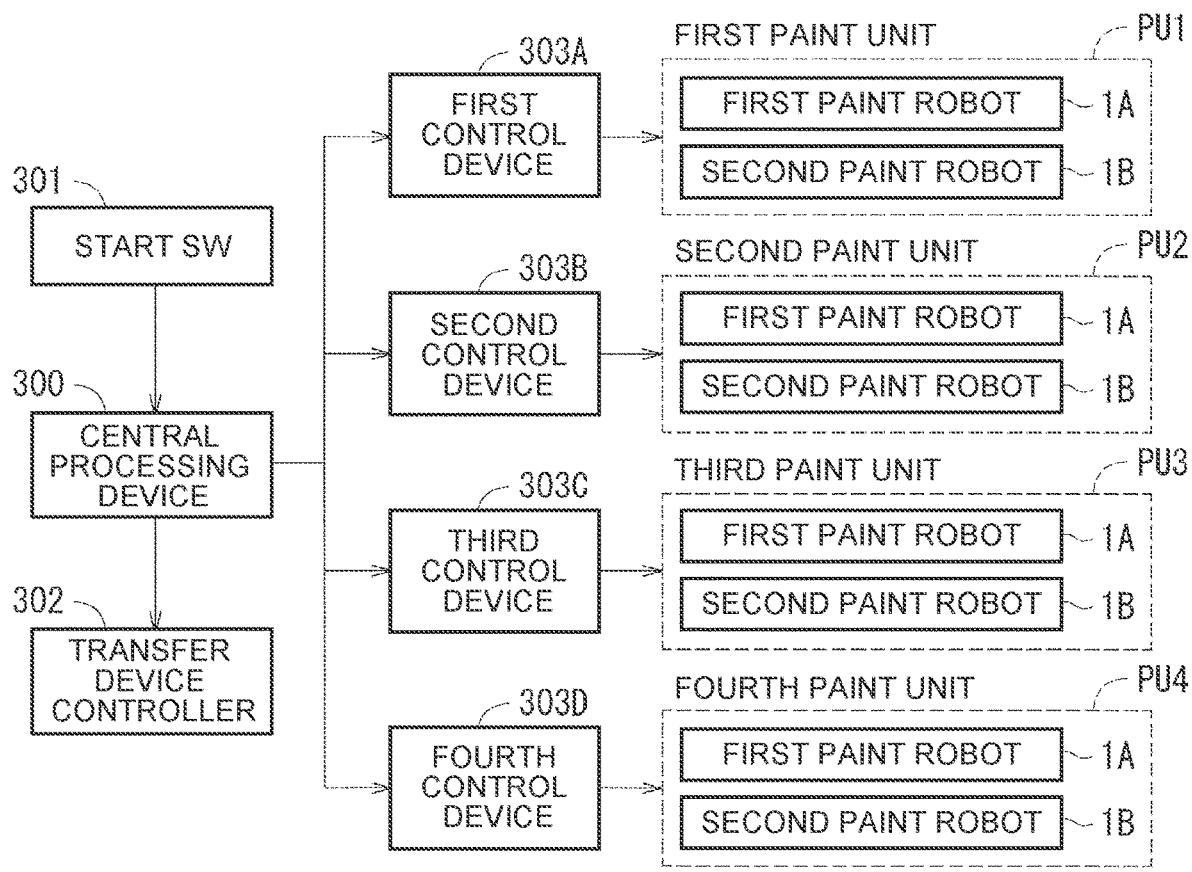
FIG. 6 is a block diagram illustrating a schematic configuration of a control system for the paint system.

Next, a control system for the paint units will be described. FIG. 6 is a block diagram illustrating a schematic configuration of the control system for the paint system PS according to the present embodiment. In the control system for the paint system PS, as illustrated in FIG. 6, a central processing device 300 that integrally controls the paint system PS, a start switch (start SW) 301, a transfer device controller 302, the first to fourth control devices 303A to 303D, and the first to fourth paint units PU1 to PU4 are electrically connected to each other to enable transmission and reception of various signals such as command signals.

The start switch 301 transmits a start command signal for the paint system PS to the central processing device 300 in accordance with an operation by an operator. When the start command signal is received, the paint system PS is started to start paint operation to be discussed later.

The transfer device controller 302 controls transfer of the vehicle body 150 by the transfer device 5. Specifically, the transfer device 5 is actuated until the vehicle body 150 reaches a predetermined position (the position indicated in FIG. 1) in the paint booth 100, and since then, the vehicle body 150 is moved at a predetermined transfer speed (a speed set in advance and suited for paint operation). After the predetermined time has elapsed since painting of the vehicle body 150 was finished, the transfer device 5 is actuated such that the vehicle body 150 is transferred from the paint booth 100 toward the next station at a speed for vehicle body transfer and a new vehicle body 150 to be painted next is transferred to the paint booth 100.

The control devices 303A to 303D receive a command signal from the central processing device 300, and output a control command signal to the paint units PU1 to PU4, respectively, in accordance with the control command signal. That is, the first control device 303A outputs a control command signal to the paint robots (first paint robot 1A and second paint robot 1B) of the first paint unit PU1, the second control device 303B outputs a control command signal to the paint robots 1A and 1B of the second paint unit PU2, the third control device 303C outputs a control command signal to the paint robots 1A and 1B of the third paint unit PU3, and the fourth control device 303D outputs a control command signal to the paint robots 1A and 1B of the fourth paint unit PU4. Upon receiving the control command signal, the paint robots 1A and 1B of each of the paint units PU1 to PU4 paint the vehicle body 150 in accordance with information on teaching performed in advance.

Operation During Painting

Next, paint operation (paint method) by the paint system PS will be described. The paint operation is performed without humans in the paint chamber 2.

First, the paint system PS is started as the start switch 301 is operated. As the paint system PS is started, air at an adjusted temperature and an adjusted humidity flows from the air conditioner (not illustrated) into the air supply chamber 3 via the air supply duct 7 before the paint operation is started. In the air supply chamber 3, the amount of air is adjusted by the air amount adjustment mechanism 31, and the air is introduced into the paint chamber 2 via the filter 23 at the introduction port 21a.

In the paint chamber 2, air directed from the air supply chamber 3 toward the recovery chamber 4 flows through the predetermined region Ri. That is, a flow (downward flow) of air directed downward from the introduction port 21a toward the discharge port 22a is formed in the predetermined region Ri.

The air that has passed through the predetermined region Ri of the paint chamber 2 is discharged to the recovery chamber 4 via the grid plate 24 at the discharge port 22a. In the recovery chamber 4, the amount of air is adjusted by the air amount adjustment mechanism 42, and the air is released to the outside via the air discharge duct 8.

Next, the transfer device 5 is actuated in accordance with a command signal from the transfer device controller 302, to move the vehicle body 150 to be painted until the vehicle body 150 reaches a predetermined position (the position indicated in FIG. 1) in the paint booth 100. The vehicle body 150 is painted with the paint robots 1A and 1B of each of the paint units PU1 to PU4 operating in accordance with the command signal from the control devices 303A to 303D while the vehicle body 150 is transferred at a predetermined speed.

In painting the vehicle body 150, the upper region of the vehicle body 150 is painted by the respective first paint robots 1A of the paint units PU1 to PU4, and the lower region of the vehicle body 150 on the lower side with respect to the upper region is painted by the respective second paint robots 1B of the paint units PU1 to PU4. Specifically, the respective first paint robots 1A, 1A of the first paint unit PU1 and the second paint unit PU2 mainly paint the front half of the roof and the engine hood of the vehicle body 150, and the respective second paint robots 1B, 1B of the first paint unit PU1 and the second paint unit PU2 mainly paint the front fender and the front door of the vehicle body 150. Meanwhile, the respective first paint robots 1A, 1A of the third paint unit PU3 and the fourth paint unit PU4 mainly paint the rear half of the roof of the vehicle body 150, and the respective second paint robots 1B, 1B of the third paint unit PU3 and the fourth paint unit PU4 mainly paint the rear fender and the rear door of the vehicle body 150. In the paint operation performed by the paint robots 1A and 1B, the vehicle body 150 is painted with the paint robot arms 12A and 12B operating such that the spray guns 11A and 11B are moved along a predetermined track (a predetermined track based on teaching information) while facing a region to be painted by the paint robots 1A and 1B.

Figure 7:
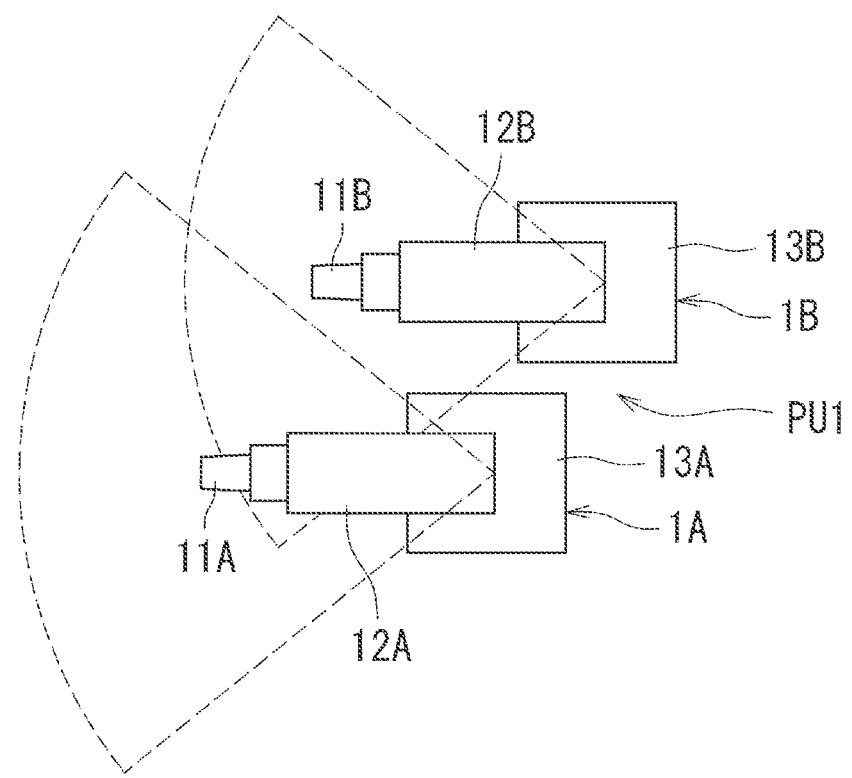
FIG. 7 is a plan view illustrating the respective movable ranges of a first robot arm and a second robot arm.
Figure 8:
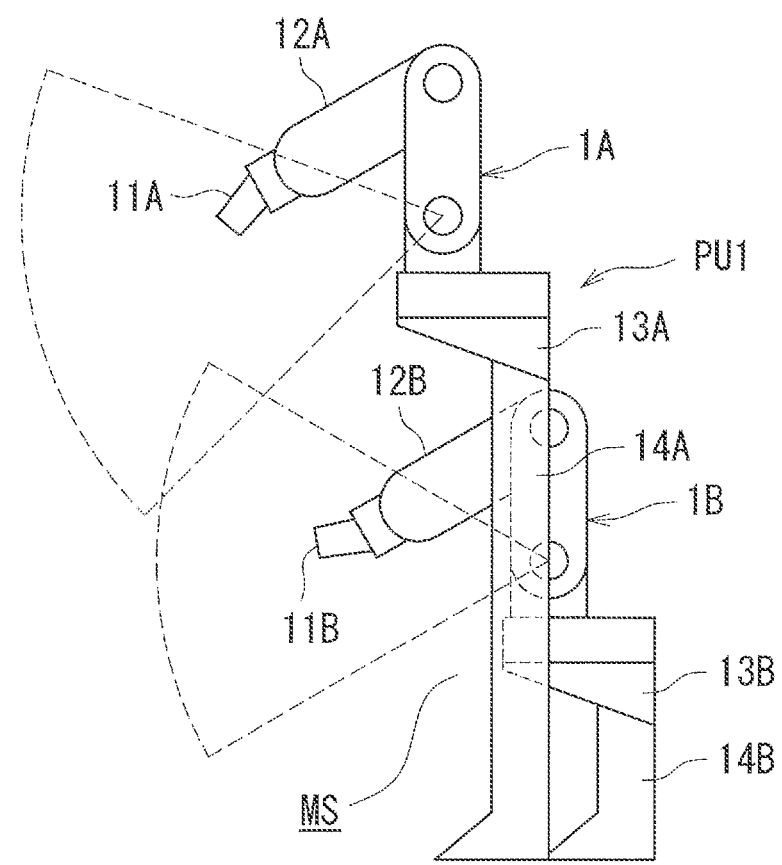
FIG. 8 is a front view illustrating the respective movable ranges of spray guns.

In this event, the second robot arm 12B of the second paint robot 1B, the second robot base 13B of which is positioned below the arrangement height position of the first robot base 13A, paints the lower region on the lower side with respect to the region painted by the first paint robot 1A while passing through the passage range MS which is provided under the first robot base 13A. FIG. 7 is a plan view illustrating the respective movable ranges of the robot arms 12A and 12B of the paint robots 1A and 1B (the respective movable ranges of the robot arms 12A and 12B determined using the respective base end positions of the robot arms 12A and 12B as base points, including the respective movable ranges of the spray guns 11A and 11B) during painting. FIG. 8 is a front view illustrating the respective movable ranges of the spray guns 11A and 11B of the paint robots 1A and 1B during painting. The regions inside the dashed lines in the drawings represent the movable ranges. As illustrated in FIGS. 7 and 8, the movable range of the second robot arm 12B and the movable range of the spray gun 11B include the passage range MS which is provided under the robot base 13A of the first paint robot 1A, and the lower region of the vehicle body 150 (the region on the lower side with respect to the region painted by the first paint robot 1A) is painted while the second robot arm 12B and the spray gun 11B are passing through the passage range MS.

In this manner, the second robot arm 12B paints the lower region on the lower side with respect to the region painted by the first paint robot 1A without interfering with the first paint robot 1A and with a sufficient movable range secured, even if the position of the first robot base 13A is set to a position that is close to the transfer path (a position that is closer to the reference plane L than the position of the second robot base 13B).

In the paint operation, more specifically, the paint robots 1A and 1B perform painting in an electrostatic atomization method in which shaping air is not used. Specifically, as illustrated in FIG. 5, the rotary head 51 is rotated by an air motor (not illustrated) with the voltage generator 54 applying a negative high voltage to the rotary head 51 and with the vehicle body 150 grounded. The distance between the rotary head 51 and the vehicle body 150 is adjusted by the robot arms 12A and 12B. As illustrated in FIG. 3, liquid paint is supplied from the paint supply pipe 53 to the paint space S, and the paint flows out through the outflow holes 511a because of a centrifugal force.

The paint that has flowed out through the outflow holes 511a flows outward in the radial direction along the diffusion surface 51a because of a centrifugal force. The paint that flows along the diffusion surface 51a is formed into a film form, and reaches the outer edge portion 51b to be supplied to the plurality of groove portions 51c (see FIG. 4). Paint in each groove portion 51c is separated from paint in adjacent groove portions 51c. The paint passing through the groove portions 51c is formed into streaks to be released from the outer end portion, in the radial direction, of the rotary head 51 (the groove portions 51c at the outer peripheral surface of the rotary head 51).

As illustrated in FIG. 5, the streaks of paint P1 released from the rotary head 51 are electrostatically atomized to form paint particles P2. An electric field is formed between the rotary head 51 and the vehicle body 150, and the paint particles P2 which are negatively charged are drawn toward the vehicle body 150. Therefore, the paint particles P2 are applied to the vehicle body 150 to form a paint film (not illustrated) on the surface of the vehicle body 150.

In the paint robots 1A and 1B, as illustrated in FIG. 1, the robot arms 12A and 12B move the spray guns 11A and 11B along the surface of the vehicle body 150 while the spray guns 11A and 11B are painting. Therefore, the paint robots 1A and 1B paint respective regions of the surface of the vehicle body 150. Consequently, the entire surface of the vehicle body 150 is painted.

During the painting, paint particles (overspray mist) that have not been applied to the vehicle body 150 are generated. The range of generation of the overspray mist is included in the predetermined region Ri. Thus, the overspray mist generated during the painting is carried downward by a downward flow to be discharged into the recovery chamber 4. In the recovery chamber 4, the overspray mist is recovered by the filter 41. That is, the filter 41 removes the paint particles that have not been applied to the vehicle body 150 from the air to purify the air to be fed to the air discharge duct 8.

When the entire surface of the vehicle body 150 is painted in this manner to complete the paint operation, the vehicle body 150 is transferred out of the paint booth 100 by the transfer device 5, and a next vehicle body 150 to be painted is transferred into the paint booth 100 to be subjected to similar paint operation. When the amount of paint remaining in the paint cartridge loaded into the spray guns 11A and 11B has become small as paint operation on the new vehicle body 150 is started, or when the type of paint to be used for paining of the new vehicle body 150 is changed, a desired paint cartridge is transferred from the cartridge stockers 205 and 206 toward the spray guns 11A and 11B in order to replace the paint cartridge loaded into the spray guns 11A and 11B.

Effects of Embodiment

In the present embodiment, as described above, the distance between the first robot base 13A of the first paint robot 1A, which paints the upper region of the vehicle body 150, and the reference plane L is set to be shorter than the distance between the second robot base 13B of the second paint robot 1B, which paints the lower region of the vehicle body 150 on the lower side with respect to the upper region, and the reference plane L. In addition, the passage range MS which allows passage of the second robot arm 12B of the second paint robot 1B is provided under the first robot base 13A. That is, the second robot arm 12B can paint the lower region on the lower side with respect to the region painted by the first paint robot 1A without interfering with the first paint robot 1A and with a sufficient movable range secured, even though the position of the first robot base 13A is set to a position that is close to the transfer device 5 (a position that is closer to the reference plane L than the position of the second robot base 13B). That is, a sufficient movable range of the second robot arm 12B can be secured while reducing the length of the first robot arm 12A by reducing the distance between the vehicle body 150 and the first robot base 13A by setting the position of the first robot base 13A to a position that is close to the reference plane L. Therefore, it is possible to reduce the size of the paint robots (in particular, the first paint robot 1A) and increase the movable range of the robot arms (in particular, the second robot arm 12B) at the same time. As a result, it is possible to reduce the size of the paint system PS along with a reduction in the size of the paint robots, and reduce the equipment cost and the running cost. It is also possible to reduce $CO_2$ because of a reduction in the size of the paint system PS. It is also possible to paint well the lower region on the lower side with respect to the region painted by the first paint robot 1A because of an increase in the movable range of the second robot arm 12B. Since the length of the first robot arm 12A can be reduced, the paint robots 1A and 1B can be of the same configuration as discussed earlier. This also allows a reduction in the equipment cost.

In the present embodiment, the second robot arm 12B passes through the passage range MS, which is provided under the first robot base 13A, to avoid interference with the first paint robot 1A. Therefore, the arrangement position of the first paint robot 1A and the arrangement position of the second paint robot 1B in the length direction (Y direction) of the paint chamber 2 can be brought close to each other. Therefore, it is possible to reduce the size of the internal space required for the paint booth 100. In the paint booth 100, as discussed earlier, a downward flow of air is formed so that a good flow of paint particles can be obtained inside the paint booth 100. With the internal space of the paint booth 100 reduced in size, however, it is possible to reduce the size of a space in which such a downward flow is generated, and reduce the size of an air conditioning device for generating the downward flow or reduce energy consumption.

In the present embodiment, a single control device 303A (303B, 303C, 303D) is provided to control both operation of the first paint robot 1A and operation of the second paint robot 1B. Therefore, it is possible to reduce the size of the control unit (a unit for paint robot control, including the control devices 303A to 303D) as a whole compared to the case where a plurality of control devices is provided to individually control operation of the paint robots 1A and 1B, thereby contributing to a reduction in the size of the paint system PS.

In the present embodiment, the control devices 303A to 303D are housed in the auxiliary booths 201 and 202 which are arranged outside the paint booth 100. Therefore, it is possible to reduce the size of the internal space required for the paint booth 100 compared to the case where the control devices are arranged inside the paint booth 100. This also makes it possible to reduce the size of a space in which a downward flow discussed earlier is generated, and reduce the size of an air conditioning device for generating the downward flow or reduce energy consumption.

In the paint system PS according to the present embodiment, the plurality of paint units PU1 to PU4 is arranged on opposite sides of the reference plane L. Therefore, it is possible to paint regions of the vehicle body 150 on one side (a first side) and the other side (a second side) with respect to the reference plane L well using the paint robots 1A, 1B, . . . of each of the paint units PU1 to PU4, and finish the painted surfaces of the vehicle body 150 well.

In the present embodiment, the spray guns 11A and 11B electrostatically atomize paint and spray the paint toward the vehicle body 150. Therefore, it is possible to improve the efficiency in applying the paint to the vehicle body 150, and reduce the range in which the paint sprayed toward the vehicle body 150 is splashed back. Therefore, it is not necessary that the paint robots 1A and 1B should be arranged at positions significantly away from the vehicle body 150 so that the paint splashed back does not adhere to the paint robots 1A and 1B, and the arrangement positions of the paint robots 1A and 1B can be set to positions that are close to the vehicle body 150. As a result, it is possible to reduce the size of the paint system PS by reducing the length of the paint system PS in the width direction. It is also possible to reduce $CO_2$ because of a reduction in the size of the paint system PS.

Second Embodiment

Next, a second embodiment will be described. In the present embodiment, the manner of arrangement of the paint robots 1A and 1B in each of the paint units PU1 to PU4 is different from that according to the first embodiment.

Figure 9:
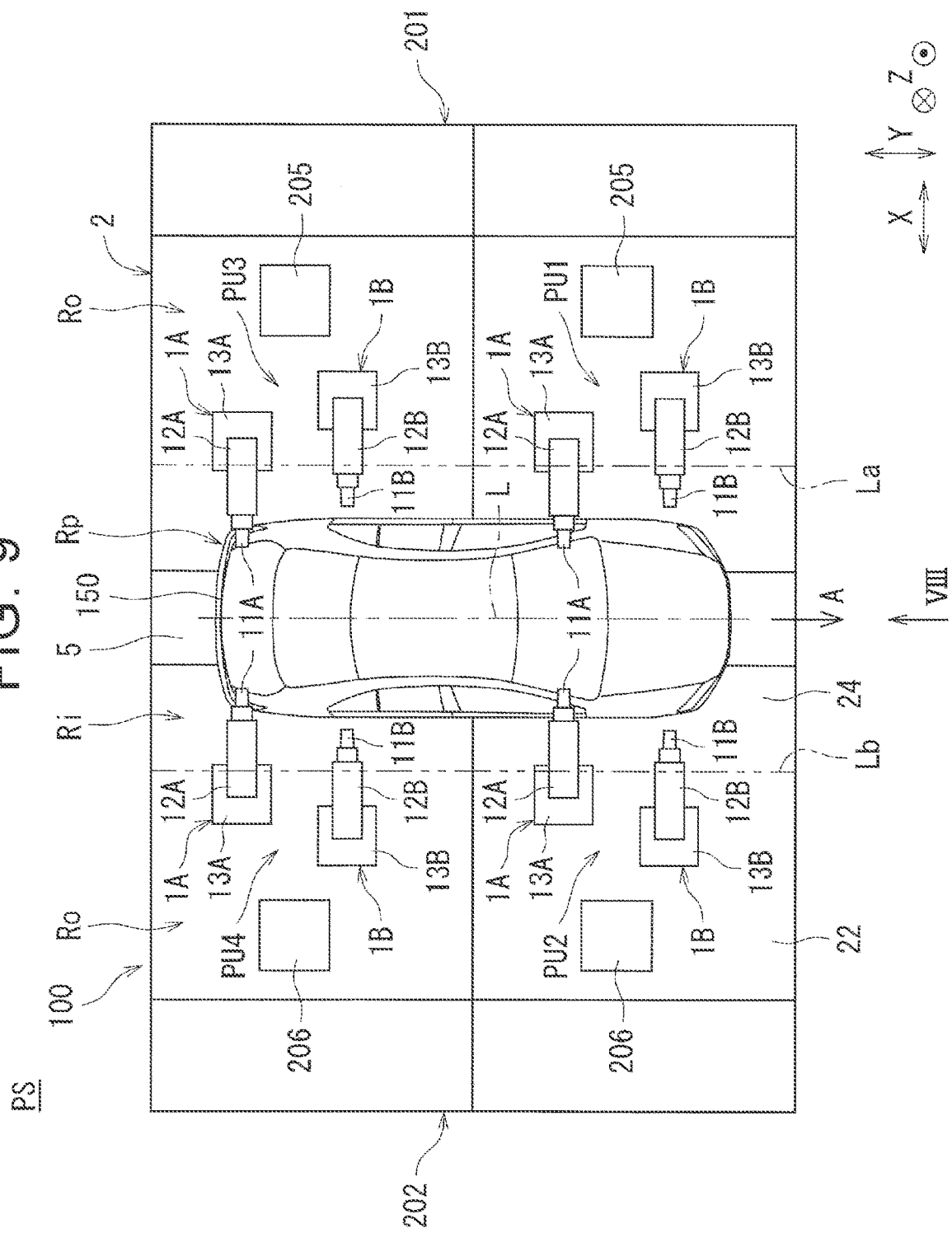
FIG. 9 is a plan view illustrating a paint system according to a second embodiment.
Figure 10:
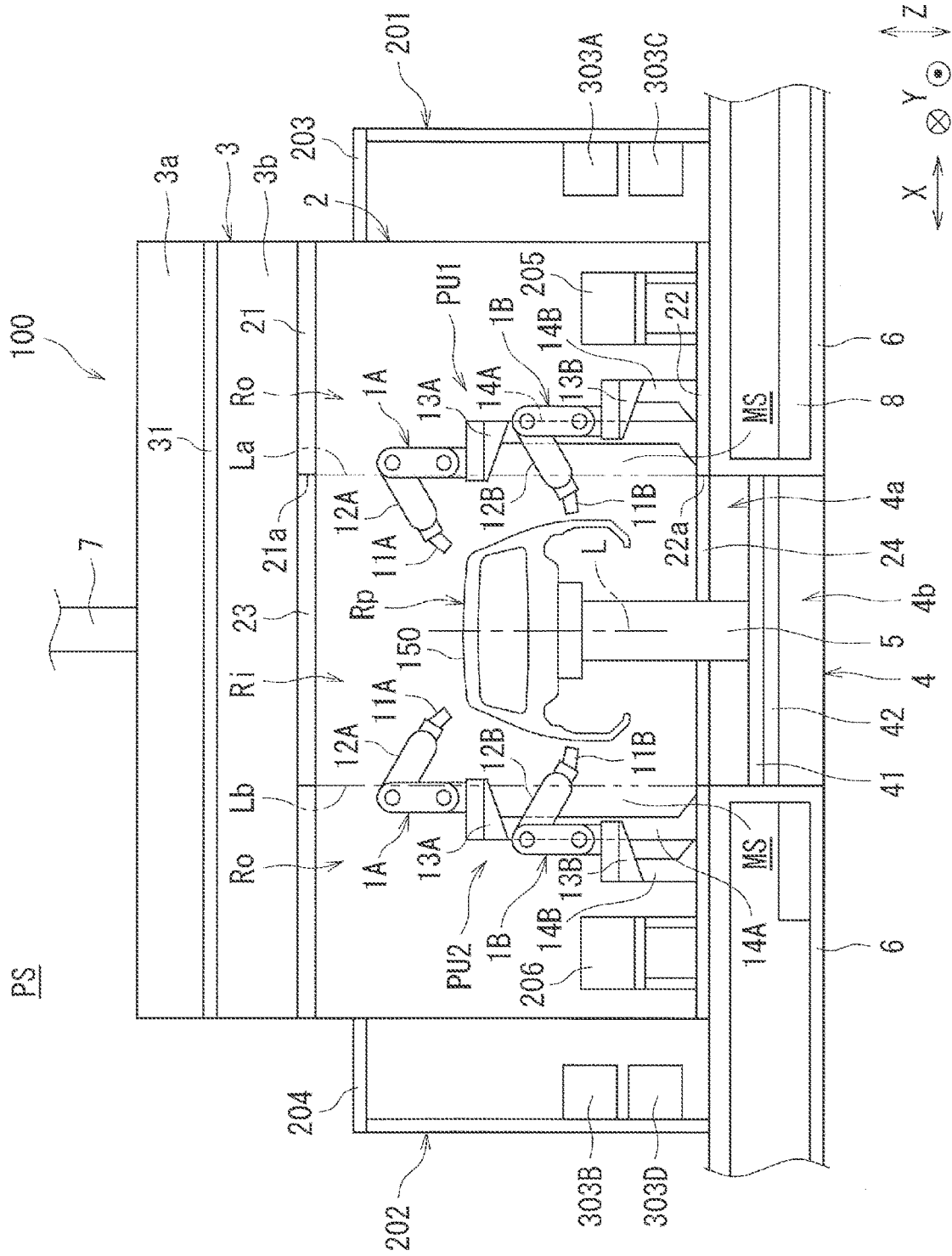
FIG. 10 is a front view illustrating the paint system according to the second embodiment.

FIG. 9 is a plan view illustrating a paint system PS according to the present embodiment. FIG. 10 is a front view illustrating the paint system PS according to the present embodiment. In each of the paint units PU1 to PU4 of the paint system PS according to the present embodiment, as illustrated in the drawings, the first paint robot 1A and the second paint robot 1B are arranged such that the first paint robot 1A is arranged upstream of the second paint robot 1B in the transfer direction of the vehicle body 150. Also in the present embodiment, as in the first embodiment discussed earlier, the distance between the installation position of the support column 14A of the first paint robot 1A in each of the paint units PU1 to PU4 and the reference plane L is set to be shorter than the distance between the installation position of the support column 14B of the second paint robot 1B and the reference plane L. The arrangement height position of the first robot base 13A is set to be higher than the arrangement height position of the second robot base 13B. This allows the range provided under the first robot base 13A to be secured as the passage range MS for the second robot arm 12B during paint work.

Therefore, also with the present embodiment, a sufficient movable range of the second robot arm 12B can be secured while reducing the length of the first robot arm 12A by setting the position of the first robot base 13A to a position that is close to the reference plane L to reduce the distance between the vehicle body 150 and the first robot base 13A. As a result, it is possible to reduce the size of the paint robots (in particular, the first paint robot 1A) and increase the movable range of the robot arms (in particular, the second robot arm 12B) at the same time.

Third Embodiment

Next, a third embodiment will be described. In the embodiments discussed earlier, paint operation is performed while the vehicle body 150 is transferred by the transfer device 5. In the present embodiment, instead, paint operation is performed while the paint units PU1 to PU4 are moved along the horizontal direction.

Figure 11:
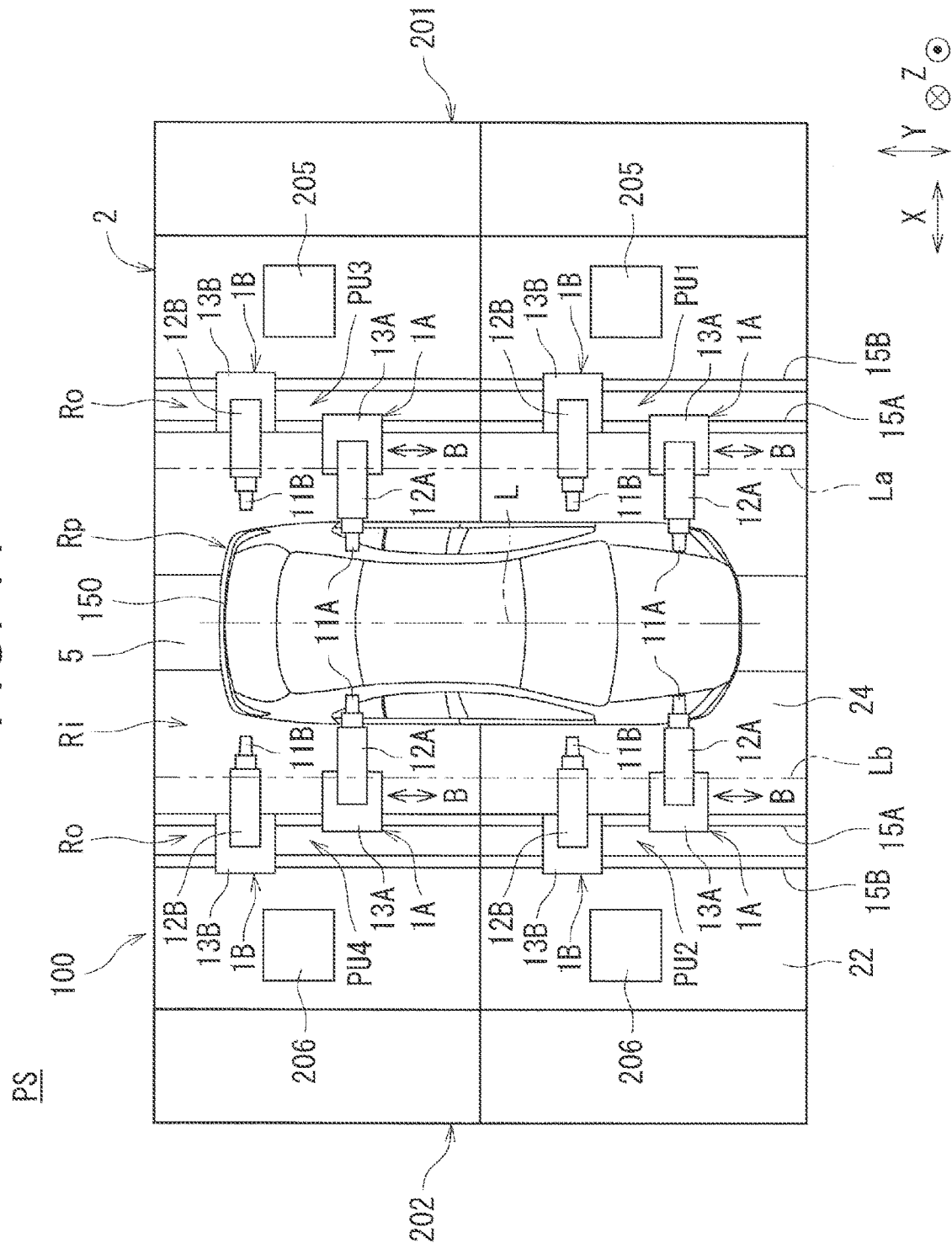
FIG. 11 is a plan view illustrating a paint system according to a third embodiment.

FIG. 11 is a plan view illustrating a paint system PS according to the present embodiment. In the present embodiment, as illustrated in FIG. 11, the first paint robot 1A and the second paint robot 1B in each of the paint units PU1 to PU4 are arranged such that the first paint robot 1A is arranged downstream of the second paint robot 1B in the transfer direction of the vehicle body 150 (the same manner of arrangement as in the first embodiment), and the paint robots 1A and 1B are movable on rails 15A and 15B (see the arrows B in FIG. 11). In a specific example, wheels (not illustrated) arranged at the lower portion of the support columns 14A and 14B of the paint robots 1A and 1B are placed so as to be able to travel on the rails 15A and 15B, and configured to include an electric motor that applies power for travel to the wheels. The other components are the same as those according to the embodiments discussed earlier.

In the paint operation according to the present embodiment, the transfer device 5 is stopped when the vehicle body 150 reaches a predetermined position (the position indicated in FIG. 11) in the paint booth 100 through actuation of the transfer device 5. In this state, the vehicle body 150 is painted with the paint robots 1A and 1B of each of the paint units PU1 to PU4 operating in accordance with a command signal from the control devices 303A to 303D while the paint robots 1A and 1B are traveling on the rails 15A and 15B (e.g. traveling from the front side toward the rear side of the vehicle body 150).

Also with the present embodiment, the same effects as those of the embodiments discussed earlier can be achieved.

Fourth Embodiment

Next, a fourth embodiment will be described. Also in the present embodiment, paint operation is performed while the paint units PU1 to PU4 are moved along the horizontal direction.

Figure 12:
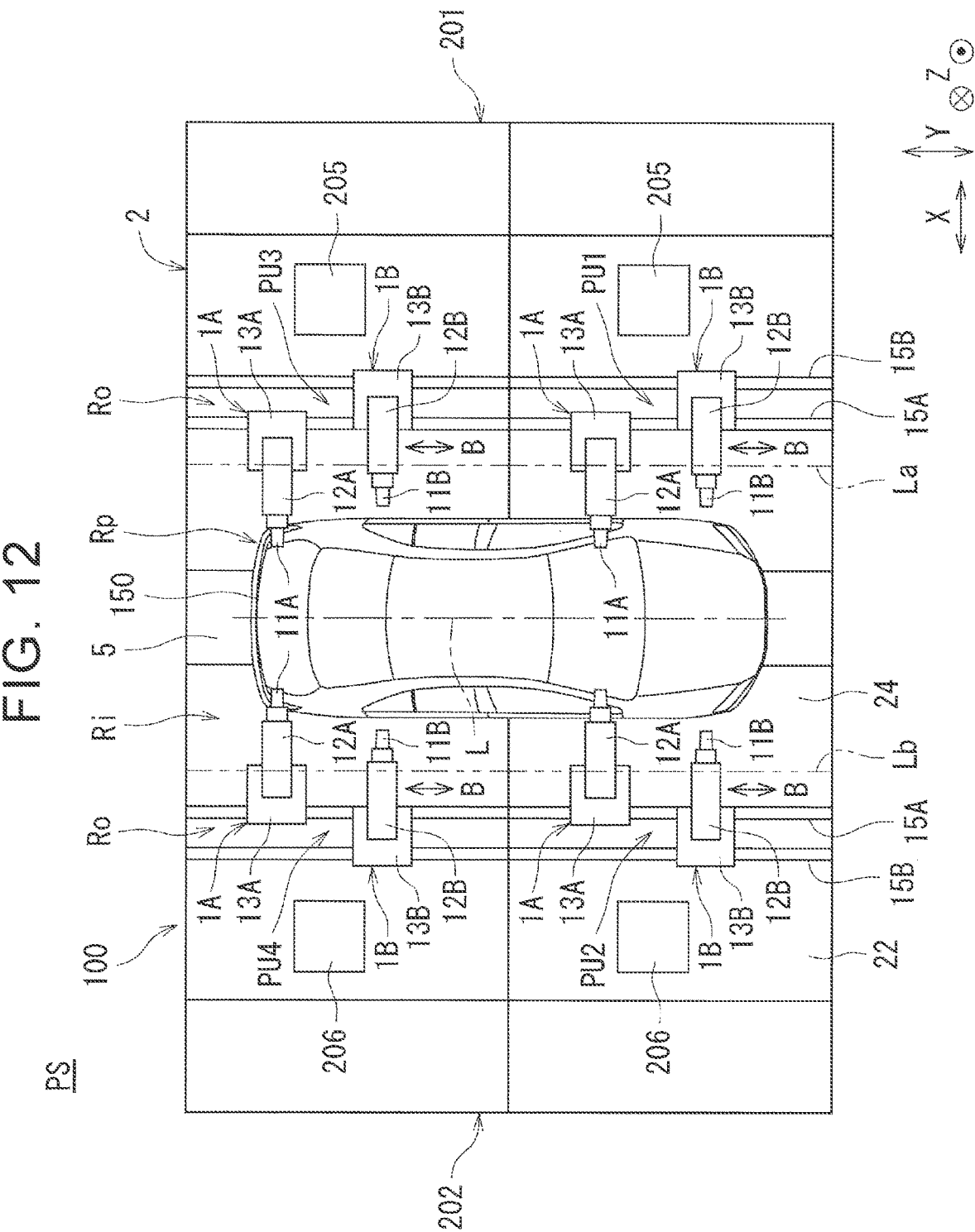
FIG. 12 is a plan view illustrating a paint system according to a fourth embodiment.

FIG. 12 is a plan view illustrating a paint system PS according to the present embodiment. In the present embodiment, as illustrated in FIG. 12, the first paint robot 1A and the second paint robot 1B in each of the paint units PU1 to PU4 are arranged such that the first paint robot 1A is arranged upstream of the second paint robot 1B in the transfer direction of the vehicle body 150 (the same manner of arrangement as in the second embodiment), and the paint robots 1A and 1B are movable on the rails 15A and 15B (see the arrows B in FIG. 12) as in the third embodiment discussed earlier. The other components are the same as those according to the embodiments discussed earlier. In addition, the paint operation according to the present embodiment is the same as that according to the third embodiment discussed earlier.

Also with the present embodiment, the same effects as those of the embodiments discussed earlier can be achieved.

Fifth Embodiment

Next, a fifth embodiment will be described. In the embodiments discussed earlier, the object to be painted is the vehicle body 150, and the first paint robot 1A paints a horizontal surface such as a roof. In the present embodiment, instead, both the first paint robot 1A and the second paint robot 1B paint a vertical surface, and a region to be painted by the first paint robot 1A is located above a region to be painted by the second paint robot 1B.

Figure 13:
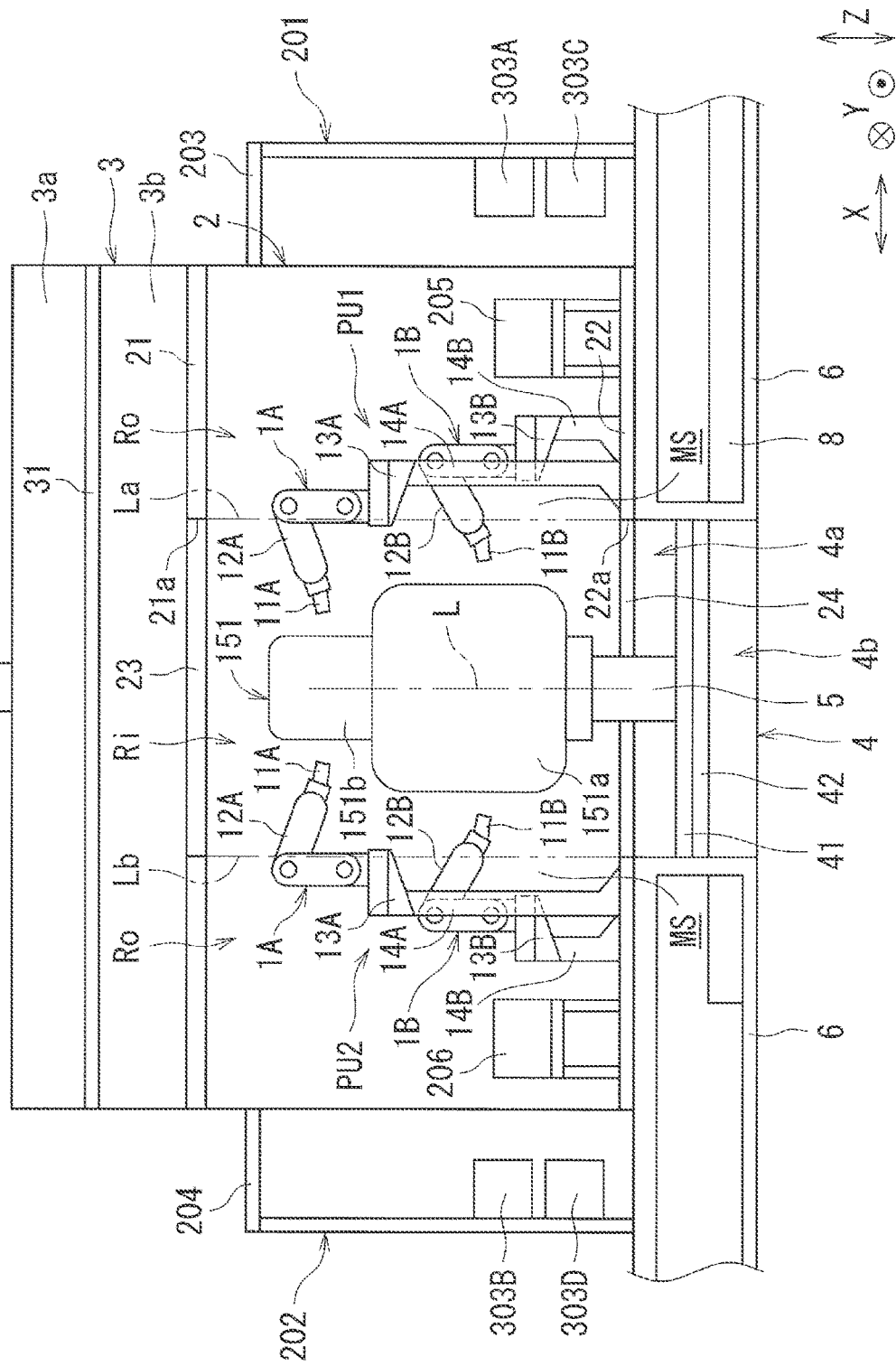
FIG. 13 is a front view illustrating a paint system according to a fifth embodiment.

FIG. 13 is a front view illustrating a paint system PS according to the present embodiment. As illustrated in FIG. 13, an object to be painted 151 according to the present embodiment includes a body portion 151a and a projecting portion 151b that projects upward from the upper surface of the body portion 151a, and the width of the body portion 151a is larger than the width of the projecting portion 151b. A side surface of the body portion 151a is painted by the second paint robot 1B. A side surface of the projecting portion 151b is painted by the first paint robot 1A.

Also with the present embodiment, the same effects as those of the embodiments discussed earlier can be achieved.

Other Embodiments

The present disclosure is not limited to the embodiments described above, and can be modified and applied in all manners that fall within the scope of the claims and the scope of equivalence thereto.

For example, while the object to be painted is the vehicle body 150 in the first to fourth embodiments and the object to be painted 151 which includes the body portion 151a and the projecting portion 151b is to be painted in the fifth embodiment, the present disclosure is also applicable to a case where a different object is to be painted.

In the embodiments described above, the paint system PS includes eight paint robots 1A, 1B, . . . . However, the number of the paint robots 1A, 1B, . . . is not limited thereto. In the embodiments described above, each of the paint units PU1 to PU4 includes two paint robots 1A and 1B. However, each of the paint units may include three or more paint robots. Also in this case, at least two of the three or more paint robots that constitute the paint unit have the relationship according to the present disclosure (a configuration in which the distance between the first robot base 13A and the reference plane L is set to be shorter than the distance between the second robot base 13B and the reference plane L and the passage range MS which allows passage of the second robot arm 12B is provided under the first robot base 13A).

In the embodiments described above, painting is performed while the object to be painted (the vehicle body 150 or the object to be painted 151) and the paint units PU1 to PU4 are moving relative to each other. The present disclosure is not limited thereto. The present disclosure is also applicable to a case where painting is performed without the object to be painted 150, 151 and the paint units PU1 to PU4 being moved relative to each other.

In the embodiments described above, the respective first paint robots 1A and 1A of the first paint unit PU1 and the second paint unit PU2 are configured to face each other with the passage region Rp interposed therebetween, and the respective second paint robots 1B and 1B of the first paint unit PU1 and the second paint unit PU2 are configured to face each other with the passage region Rp interposed therebetween. Similarly, the respective first paint robots 1A and 1A of the third paint unit PU3 and the fourth paint unit PU4 are configured to face each other with the passage region Rp interposed therebetween, and the respective second paint robots 1B and 1B of the third paint unit PU3 and the fourth paint unit PU4 are configured to face each other with the passage region Rp interposed therebetween. The present disclosure is not limited thereto. The respective first paint robots 1A and 1A may be configured not to face each other with the passage region Rp interposed therebetween, or the respective second paint robots 1B and 1B may be configured not to face each other with the passage region Rp interposed therebetween. For example, the first paint unit PU1 and the third paint unit PU3 may be configured in accordance with the layout according to the first embodiment (a layout in which the first paint robot 1A is arranged downstream of the second paint robot 1B in the transfer direction of the vehicle body 150; see FIG. 1), and the second paint unit PU2 and the fourth paint unit PU4 may be configured in accordance with the layout according to the second embodiment (a layout in which the first paint robot 1A is arranged upstream of the second paint robot 1B in the transfer direction of the vehicle body 150; see FIG. 9). Alternatively, the first paint unit PU1 and the third paint unit PU3 may be configured in accordance with the layout according to the second embodiment (a layout in which the first paint robot 1A is arranged upstream of the second paint robot 1B in the transfer direction of the vehicle body 150), and the second paint unit PU2 and the fourth paint unit PU4 may be configured in accordance with the layout according to the first embodiment (a layout in which the first paint robot 1A is arranged downstream of the second paint robot 1B in the transfer direction of the vehicle body 150). With this configuration, it is possible to reduce the possibility that the first paint robots 1A and 1A interfere with each other when painting the middle portion of the roof etc.

In the embodiments described above, the paint may be water-based paint, or may be solvent-based paint.

The present disclosure is applicable to a paint system that includes a plurality of paint units, in each of which a first paint robot that paints an upper region of a vehicle body and a second paint robot that paints a lower region of the vehicle body on the lower side with respect to the upper region are disposed on the same side with respect to a predetermined reference plane.

What is claimed is:

1. A paint system comprising a paint unit that has a first paint robot configured to paint an upper region of an object to be painted and a second paint robot configured to paint a lower region of the object to be painted on a lower side with respect to the upper region, wherein:
   the first paint robot includes a first robot base and a first robot arm operably mounted on the first robot base;
   the second paint robot includes a second robot base and a second robot arm operably mounted on the second robot base;
   the object to be painted and the paint unit are movable relative to each other along a horizontal direction, and when a virtual plane that extends in a vertical direction and along a direction of relative movement between the object to be painted and the paint unit is defined as a reference plane, the first paint robot and the second paint robot are disposed on the same side with respect to the reference plane;
   a distance between the first robot base and the reference plane is set to be shorter than a distance between the second robot base and the reference plane; and
   an arrangement height position of the first robot base is set to be higher than an arrangement height position of the second robot base, and a robot arm passage range that allows passage of the second robot arm is provided under the first robot base.

2. The paint system according to claim 1, further comprising a single control device configured to control both operation of the first paint robot and operation of the second paint robot.

3. The paint system according to claim 2, further comprising a paint booth that constitutes a painting space that houses a transfer path for the object to be painted and the paint unit and that is blocked from outside, wherein the single control device is arranged outside the paint booth.

4. The paint system according to claim 1, wherein:
   the first robot arm and the second robot arm each include a spray gun configured to spray paint toward the object to be painted; and
   at least one of the spray guns is configured to electrostatically atomize the paint and spray the paint toward the object to be painted.

5. The paint system according to claim 1, wherein:
a plurality of the paint units including the paint unit are arranged on a first side and a second side with respect to the reference plane;
a paint unit among the plurality of paint units which is arranged on the first side with respect to the reference plane is configured such that the first paint robot paints a region, on the first side, of an upper surface of the object to be painted and the second paint robot paints a side surface, on the first side, of the object to be painted; and
a paint unit among the plurality of paint units which is arranged on the second side with respect to the reference plane is configured such that the first paint robot paints a region, on the second side, of the upper surface of the object to be painted and the second paint robot paints a side surface, on the second side, of the object to be painted.

6. The paint system according to claim 1, further comprising a rail configured to allow the first paint robot or the second paint robot to move along a transfer direction of the object to be painted.

7. The paint system according to claim 1, wherein the first paint robot and the second paint robot are configured to paint the object to be painted by spraying paint toward the object to be painted.

8. A paint method in which the paint system according to claim 1 is used, the method comprising:
the first paint robot painting the upper region of the object to be painted while the object to be painted and the paint unit are moved relative to each other along the horizontal direction; and
the second paint robot painting the lower region of the object to be painted on the lower side with respect to the upper region.

9. The paint system according to claim 1, wherein a distance between an installation position of the support column of the first robot and the reference plane is shorter than a distance between an installation position of the support column of the second robot and the reference plane.

* * * * *